March 12, 1963     F. D. SHER ET AL     3,080,936
WEIGHING SCALE
Filed Dec. 20, 1957     2 Sheets-Sheet 1

INVENTORS.
FRED D. SHER
DAVID D. STUECK
BY George W. Price
ATTORNEY

March 12, 1963   F. D. SHER ET AL   3,080,936
WEIGHING SCALE
Filed Dec. 20, 1957
2 Sheets-Sheet 2
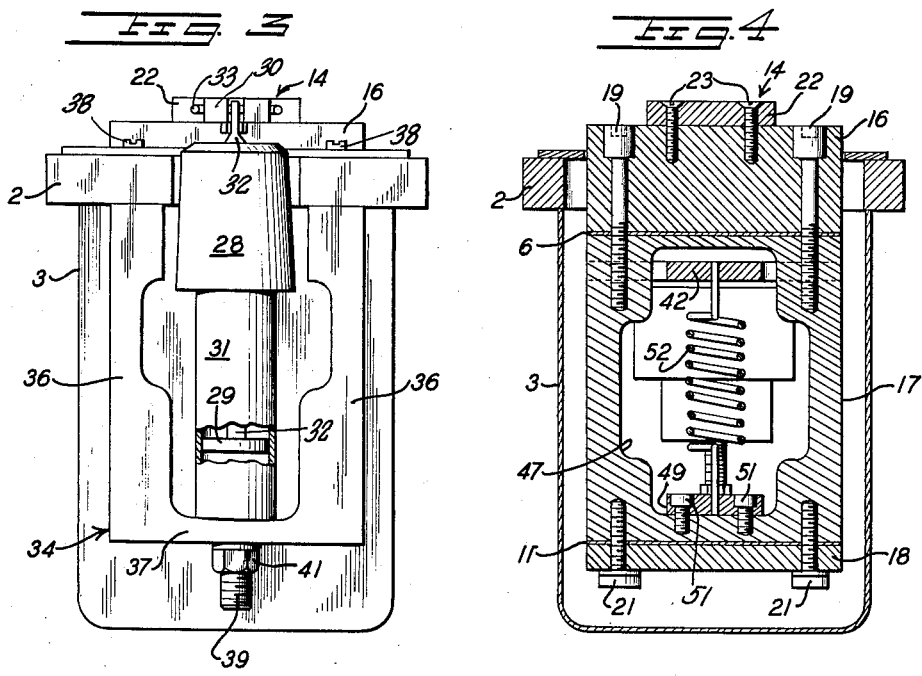
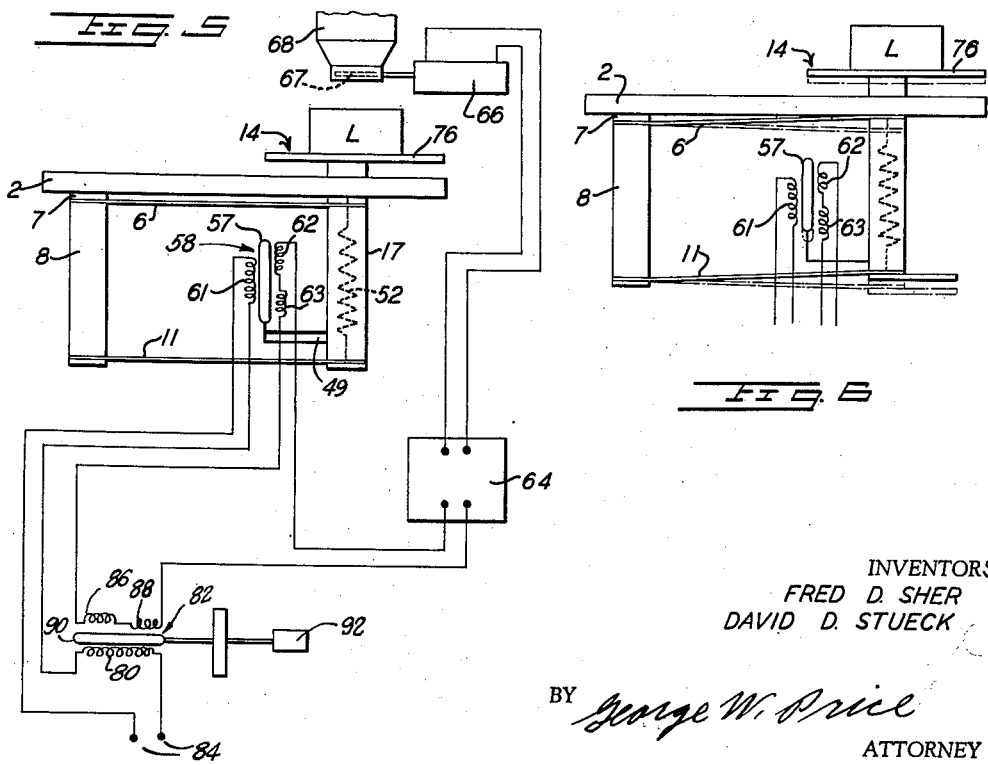
INVENTORS
FRED D. SHER
DAVID D. STUECK
BY George W. Price
ATTORNEY 3,080,936
WEIGHING SCALE
Fred D. Sher, New York, N.Y., and David D. Stueck, Hackensack, N.J., assignors, by mesne assignments, to Foils Packaging Corporation, a corporation of Ohio
Filed Dec. 20, 1957, Ser. No. 704,077
4 Claims. (Cl. 177—210)

This invention relates to weighing scales and more particularly to a spring scale in which a load supporting structure is resiliently supported and guided by means of a plurality of springs.

The present invention contemplates the provision of a weighing scale comprising a load receiving structure resiliently supported upon the ends of a pair of cantilever springs formed of relatively wide, thin sheet metal and arranged in spaced parallel relationship. A preloading force is applied to the cantilever springs by means of a spring element so that under the influence of a load within a predetermined weight range the cantilever springs will be substantially level. A deflection or motion sensing device, such as differential transformer, is supported on a fixed bracket between the cantilever springs to receive a movable core connected to the load receiving structure to produce a linear response to applied load.

An object of the present invention resides in the provision of a weighing scale adapted for use in accurately weighing the net contents of packages or containers.

Another object of the invention is to provide a scale mechanism adapted to control a package filling operation, whereby the net contents of packages are of uniform predetermined weight.

A further object of the invention is to provide a weighing scale having a linear response to applied load regardless of the position of the load on the load receiver.

Another object of the invention is to provide a weighing scale adapted to produce an electric signal responsive to applied load within a relatively short response time.

Another object of the invention resides in the provision of a weighing apparatus wherein the cantilever springs, preloading springs, and motion sensing means coact to compensate for off-center loading to provide a linear response to applied load.

The invention embodies other novel features, details of construction and arrangement of parts which are hereinafter set forth in the specification and claims and illustrated in the accompanying drawings, wherein:

FIG. 3 is an end elevation.

FIG. 4 is a transverse sectional view taken along the line 4—4 of FIG. 2.

FIGS. 5 and 6 are schematic views illustrating the invention.

Figure 1:
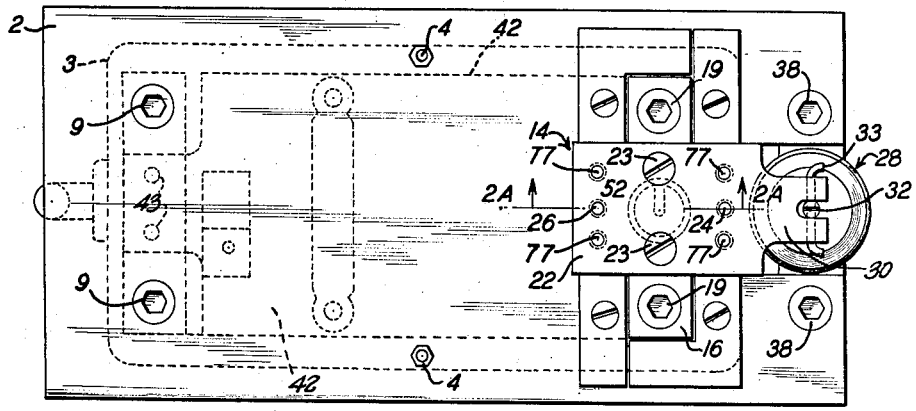
FIG. 1 is a top plan view illustrating a weighing scale embodying features of the invention.

Referring now to the drawings for a better understanding of the invention, the weighing scale is shown as comprising a top plate 2 mounted upon the upper rim of a cup-shaped housing 3 and secured thereto by bolts or cap screws 4.

One end of an upper cantilever spring 6 is clamped between an upper spacing block 7 and a fixed intermediate spacing block 8 by means of cap screws 9 which extend downwardly through aligned apertures in the top plate 2, upper spacing block 7, and the spring 6 for engagement in threaded apertures in the intermediate spacing block 8. One end of a lower cantilever spring 11 is clamped between the lower end of the intermediate spacing block 8 and a spring mounting plate 12 by means of cap screws 13 which extend through aligned apertures in the spring 11 and mounting plate 12 for threaded engagement in the intermediate spacing block 8. The cantilever springs 6 and 11 are identical and comprise flat rectangular blanks of resilient sheet metal, such as beryllium copper.

Figure 2:
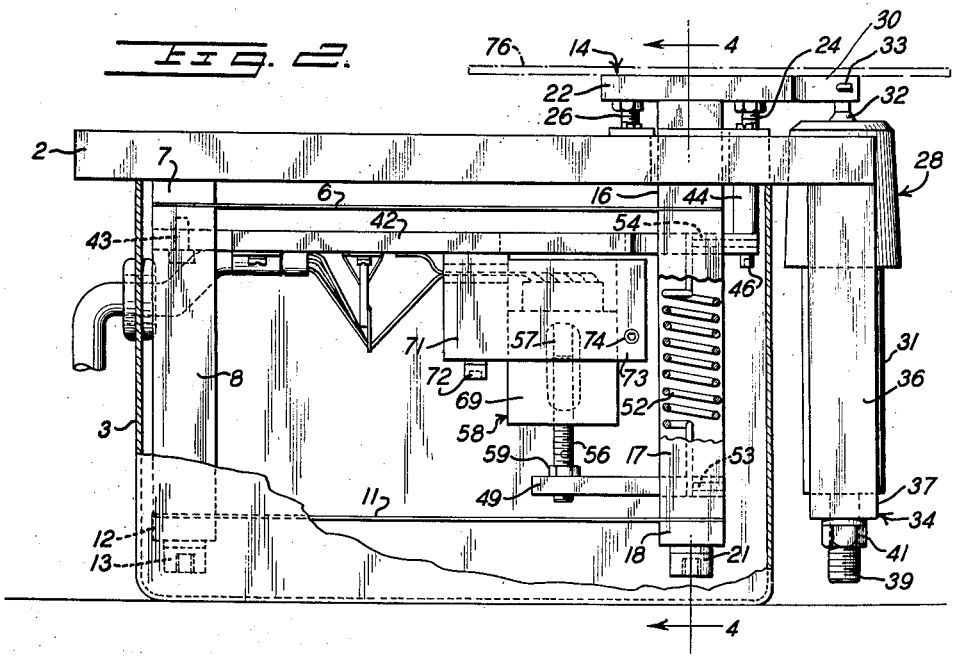
FIG. 2 is a side elevation, partly in section.

A load receiving structure, indicated generally at 14, is supported on the free ends of the cantilever springs 6 and 11 and is shown in FIGURES 2 and 4 as comprising an upper spacing block 16, a movable intermediate spacing block 17, and a spring retainer plate 18. The upper spacing block 16 and upper spring 6 are formed with aligned apertures to receive cap screws 19 for threaded engagement in the upper end of the intermediate spacing block 17. The retainer plate 18 and lower spring 11 are formed with aligned apertures to receive cap screws 21 for threaded engagement in the lower end of the intermediate spacing block 17. The intermediate spacing blocks 8 and 17 are identical and arranged in parallel relationship to define with the cantilever springs 6 and 11 a box structure having opposite sides parallel, or parallelogram when the springs are in their normal parallel unstressed condition.

Figure 2A:
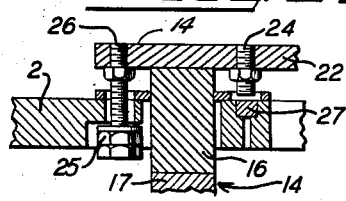
FIG. 2A is a fragmentary sectional view taken along the line 2A—2A of FIG. 1.

A loading plate 22 is secured to the upper end of the upper spacing block 16 by flat head screws 23 and is formed with threaded apertures to receive stop studs 24 and 26. The stop stud 24 is disposed to engage a hardened stop plug 27 (FIG. 2A) mounted on the top plate 2 to limit downward movement of the load receiving structure 14. The stop stud 26 extends downwardly through an aperture in the top plate 2 to receive a stop nut 25 adapted to engage the top plate 2 to limit upward movement of the load receiving structure 14.

A dash pot type snubber 28 (FIGS. 1 and 2), provided to dampen vertical movements of the load receiving structure 14, is shown as comprising a piston 29 (FIG. 3) mounted for reciprocative movements in a cylinder 31 and provided with small apertures (not shown) for the passage of air or liquids therethrough. The piston 29 is provided with a piston rod 32 which is pivotally connected to a bifurcated end 30 (FIGS. 1 and 3) of the loading plate 22 by a pin 33.

The snubber cylinder 31 is rigidly mounted on a bracket 34 which, in turn, is secured to the top plate 2. The bracket is preferably formed U-shape to provide spaced legs 36—36, interconnected by a base 37, the legs being secured to the top plate 2 by cap screws 38. The cylinder 31 is provided with a threaded end portion 39 secured to the base 37 by a nut 41.

A plate 42 (FIGS. 1 and 2) is disposed between the cantilever springs 6 and 11, one end of the plate being secured to the fixed intermediate spacing block 8 by cap screws 43, and the other end of the plate being secured to and spaced from the top plate 2 by means of spacing sleeves 44 and cap screws 46. It will be noted that the identical intermediate spacing blocks 8 and 17 are formed with openings 47, as shown in FIG. 4, to receive the ends of the plate 42, and that the block 17 is inverted with respect to the block 8 to leave clearance for vertical movement of the block 17 relative to the fixed plate 42.

A core supporting arm 49 (FIGS. 2 and 4) is secured to the intermediate spacing block 17 by cap screws 51 and is formed with an aperture to receive one end of a helical tension spring 52, said spring end being secured to the supporting arm 49 by a set screw 53. The other end of the spring 52 is secured in an aperture in the plate 42 by set screw 54.

The arm 49 is formed with a threaded aperture to receive a threaded stud 56 provided to support a movable core 57 of a differential transformer 58, said stud and core being vertically adjustable relative to said arm and secured in adjusted position by a lock nut 59. The differential transformer 58 is of conventional design and is shown schematically in FIGURE 5 as comprising an input winding 61 and two series connected bucking output windings 62 and 63. The input winding 61 of transformer 58 is connected in series with the input winding 80 of a second differential transformer 82 and to the terminals 84 of an alternating power source (not shown), such as an oscillator. The output windings 62 and 63 of differential transformer 58 are connected in series with the output windings 86 and 88 of differential transformer 82, to an amplifier 64 and in turn to a solenoid 66. Solenoid 66 actuates a slide valve 67 in a material hopper 68. The core 90 of the differential transformer 82 may be adjusted to any predetermined position. In operation, core 90 is positioned relative to coils 86 and 88 to represent a desired weight of container L and its contents. The voltage induced by this adjustment is fed to the amplifier 64 to provide a current which operates solenoid 66 to open the hopper 68. The material fed into container L will cause the scale structure 14 to be depressed and will move core 57 of differential transformer 58 downwardly. As the core 57 is moved by arm 49 relative to the windings 61, 62 and 63, the magnetic coupling between the windings is changed to vary the voltage of the output windings 62 and 63, which is opposite in phase to that of coils 86 and 88. When the output voltage of differential transformer 58 is equal and opposite to the output voltage of differential transformer 82, the control voltage to solenoid 66 falls to 0 and valve 67 is closed by some suitable means.

The differential transformer windings 61, 62 and 63 are mounted within a cylindrical housing 69 (FIG. 2) which is supported on and vertically adjustable relative to a bracket 71 secured to the plate 42 by cap screws 72. The bracket 71 is bifurcated at one end thereof to provide spaced arms 73—73 movable into clamping engagement with the housing 69 by means of a locking screw 74.

As the cantilever springs 6 and 11 are of equal length and disposed in spaced parallel relationship, they act as arms of a parallelogram to provide a substantially vertical motion to the load receiving structure 14 to which a load receiver plate 76 may be secured to the loading plate 22 by cap screws threaded into openings 77 therein.

In operation, the weighing scale is particularly adapted for use in weighing packages or containers on a production line wherein successive loads, which must be determined rapidly and accurately, are of the same general magnitude. The most accurate readings are obtained within a relatively narrow band or zone upon either side of the non-deflected horizontal position of the cantilever springs 6 and 11 wherein a substantially linear load-deflection characteristic is obtained. Such substantially horizontal position of the cantilever springs 6 and 11 at the rated capacity of the scale is accomplished by the preloading force exerted by the helical tension spring 52 which, in the absence of a load upon the load receiving plate 76, acts to flex the cantilever springs upwardly to their full line positions, as illustrated in FIG. 6.

It has been found that a satisfactory arrangement is obtained when the spring characteristics are made such that in the normal operating zone, the total suspended load is divided approximately equally between the helical tension spring 52 and the two cantilever springs 6 and 11.

FIGS. 5 and 6 in the drawings schematically illustrate the principal elements of the scale. In a no-load condition, the helical tension spring 52 applies a force acting to flex the cantilever springs upwardly to hold the load receiving plate in its raised position, as shown in full lines in FIG. 6. When a load is positioned centrally upon the load receiving plate, a force is applied vertically which overcomes the preloading force exerted by the tension spring 52 and the load receiving structure 14 descends until the weight zone is reached, wherein the cantilever springs 6 and 11 are substantially horizontal, as illustrated in FIG. 5, so that with small incremental changes in load, corresponding changes in the position of the load receiving structure will bear a linear relationship. During depression of the load receiving structure, the core 57 of the differential transformer 58 moves relative to its stationary windings 61, 62 and 63 to cause an electrical signal at the output terminals thereof indicative of the applied force as heretofore described.

The foregoing analysis assumes that the load L is so centered upon the load receiving plate 76 as to cause the resultant force to act through the vertical side formed by block 17 of the parallelogram formed by the cantilever springs 6 and 11 and the load receiving structure 14. However, if an off-center load is placed on the outer end of the load receiving plate 76 as indicated in FIGURE 5, the load receiving structure 14 is subjected to a force couple which is also applied to the cantilever springs 6 and 11 in such a manner as to pivot the load receiving structure slightly in a clockwise direction about a horizontal axis located between the outer ends of the cantilever springs. If the load L is placed on the other side of center the load receiving structure 14 will be pivoted slightly in a counterclockwise direction.

This pivoting effect tends to move the core 57 upwardly or downwardly in the transformer 58 depending upon which side of center the load L is positioned. This movement of the core 57 in the transformer 58 reduces or adds to the downward movement of the load receiving structure due to the weight of the load only. This results in an inaccurate measure of the weight of the load L and requires a greater or less amount of filler material to balance the desired setting of the differential transformer 82. However, the off center loading can be compensated for, if the core 57 of transformer 58 is located between the cantilever springs and at a virtual pivot point which is the point about which the load receiving structure 14 tends to pivot with an off center loading. At this virtual pivot point, the movement of the core 57 due to any pivoting of the load receiving structure 14 is also pivotal which will not add or subtract to the downwardly movement of the core 57 due to the weight of the load.

While the invention has been shown in but one form, it is obvious to those skilled in the art that it is not so limited, but is susceptible of various changes and modifications without departing from the invention or the scope of the appended claims.

We claim:
1. A weighing scale for use in determining the weight of a load within a narrow band ranging around a predetermined rated weight, comprising stationary support means; upper and lower cantilever springs fixed at their first ends to the support means and extending substantially horizontally therefrom in mutually parallel vertically spaced relation; a load receiving structure mounted on and interconnecting the second ends of said cantilever springs and said structure having a vertically disposed axis along which it can oscillate; a helical preloading spring disposed with its axis lying along said vertically disposed axis and with its ends fixed respectively to said support means and to said load receiving structure; and electrical weight indicating means including differential transformer means having relatively reciprocable winding and core members connected respectively between said support means and said load receiving structure for relative movement along a vertical axis when the load receiving structure is deflected.

2. In a weighing scale as set forth in claim 1, said preloading spring means normally urging the second ends of the cantilever springs to positions above the horizontal levels of their respective first ends, and all of the springs being mutually adjusted such that the cantilever springs are horizontal when the load receiving structure is deflected to said predetermined weight.

3. In a weighing scale as set forth in claim 1, the spring constant of the preloading spring being so related to the spring constants of said cantilever springs that when the load receiving structure is deflected to indicate said predetermined weight, the weight will be divided substantially equally between the preloading spring and said cantilever springs.

4. A weighing scale for a predetermined load range for use in an electrical weighing system having the rate of flow of fill material regulated by auxiliary electrical means, said weighing scale comprising, support means; two vertically spaced cantilever springs mounted on and extending horizontally from said support means; a load receiving structure for supporting a load of fill material mounted on and interconnecting the free ends of said cantilever springs and having a vertically disposed axis along which the structure can oscillate; a helical preloading spring having an axis coinciding with said vertically disposed axis fixed at one end to said support means and connected at the other end to said load supporting structure and normally flexing said two cantilever springs upwardly so that for deflections caused by loads within said predetermined load range said cantilever springs will be deflected toward a horizontal position having a substantially linear load-deflection characteristic; a differential transformer comprising a housing fixed to said support means and disposed inwardly from said load receiving structure and between intermediate portions of said springs, an input winding in said housing connected to an alternating reference voltage source, series connected bucking output windings mounted in said housing and connected to said auxiliary electrical means, a core supporting arm mounted on said load supporting structure and extending inwardly therefrom, a transformer core mounted on said arm and extending vertically into said housing for vertical movements relative to said input and output windings to vary the magnetic coupling therebetween and to cause an electrical signal to flow to said auxiliary electrical means, a differential transformer having an output winding connected to said alternating voltage source and a secondary winding connected in series with said output winding, and means for adjusting the voltage developed across said secondary winding to correspond with the desired weight.

References Cited in the file of this patent
UNITED STATES PATENTS

| | | |
|---|---|---|
| 1,923,745 | Platzer | Aug. 22, 1933 |
| 2,276,816 | Bagno | Mar. 17, 1942 |
| 2,610,052 | MacGeorge | Sept. 9, 1952 |
| 2,699,932 | Knobel | Jan. 18, 1955 |
| 2,709,790 | Swanson | May 31, 1955 |
| 2,720,111 | Clark | Oct. 11, 1955 |
| 2,728,285 | Bradley et al. | Dec. 25, 1955 |
| 2,777,661 | Merrill et al. | Jan. 15, 1957 |
| 2,786,699 | Safford et al. | Mar. 26, 1957 |
| 2,793,026 | Giardino et al. | May 21, 1957 |
| 2,801,874 | MacGeorge | Aug. 6, 1957 |